United States Patent
Kolen et al.

(10) Patent No.: US 10,748,515 B2
(45) Date of Patent: Aug. 18, 2020

(54) ENHANCED REAL-TIME AUDIO GENERATION VIA CLOUD-BASED VIRTUALIZED ORCHESTRA

(71) Applicant: Electronic Arts Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/231,040

(22) Filed: Dec. 21, 2018

(65) Prior Publication Data
US 2020/0202825 A1 Jun. 25, 2020

(51) Int. Cl.
*G10H 1/00* (2006.01)
*G06N 20/00* (2019.01)
*G06K 9/00* (2006.01)

(52) U.S. Cl.
CPC ....... *G10H 1/0066* (2013.01); *G06K 9/00355* (2013.01); *G06N 20/00* (2019.01); *G10H 2220/015* (2013.01); *G10H 2220/126* (2013.01); *G10H 2220/141* (2013.01)

(58) Field of Classification Search
CPC ........... G10H 1/0066; G10H 2220/015; G10H 2220/141; G10H 2220/126; G06K 9/00355; G06N 20/00
See application file for complete search history.

(56) References Cited

U.S. PATENT DOCUMENTS

| | | | | |
|---|---|---|---|---|
| 5,142,961 A * | 9/1992 | Paroutaud | ................ | G10F 1/00 84/2 |
| 5,315,060 A * | 5/1994 | Paroutaud | ................ | G10F 1/00 84/11 |
| 5,648,627 A * | 7/1997 | Usa | ................ | G10H 1/0556 706/900 |
| 5,808,219 A * | 9/1998 | Usa | ................ | G10H 1/00 84/477 B |
| 6,084,168 A * | 7/2000 | Sitrick | ................ | G09B 15/023 84/477 R |
| 6,297,439 B1 | 10/2001 | Browne | | |

(Continued)

FOREIGN PATENT DOCUMENTS

WO WO 2018/122730 A1 * 7/2018

*Primary Examiner* — Jeffrey Donels
(74) *Attorney, Agent, or Firm* — Knobbe, Martens, Olson & Bear, LLP

(57) ABSTRACT

Systems and methods are provided for enhanced real-time audio generation via a virtualized orchestra. An example method includes receiving, from a user device, a request to generate output associated with a musical score. Actions associated with virtual musicians with respect to respective instruments are simulated based on one or more machine learning models, with the simulated actions being associated with a virtual musician and indicative of an expected playing style during performance of the musical score. Output audio to be provided to the user device is generated, with the output audio being generated based on the simulated actions.

20 Claims, 9 Drawing Sheets

(56) References Cited

U.S. PATENT DOCUMENTS

| | | | |
|---|---|---|---|
| 6,353,174 B1* | 3/2002 | Schmidt | G10H 1/0058 709/200 |
| 6,482,087 B1* | 11/2002 | Egozy | A63F 13/12 463/7 |
| 6,898,729 B2* | 5/2005 | Virolainen | G10H 1/0066 714/4.1 |
| 8,119,898 B2* | 2/2012 | Bentson | G10G 1/00 84/609 |
| 8,653,349 B1* | 2/2014 | White | G10H 1/0025 381/119 |
| 9,418,636 B1* | 8/2016 | Malluck | G10F 1/12 |
| 9,866,731 B2* | 1/2018 | Godfrey | H04N 5/04 |
| 10,395,666 B2* | 8/2019 | Cook | G10H 1/366 |
| 2002/0005109 A1* | 1/2002 | Miller | G10H 1/0058 84/609 |
| 2002/0134222 A1* | 9/2002 | Tamura | G06F 12/121 84/622 |
| 2003/0064746 A1 | 4/2003 | Rader et al. | |
| 2003/0094093 A1* | 5/2003 | Smith | G10H 1/0058 84/609 |
| 2003/0164084 A1* | 9/2003 | Redmann | G10H 1/0058 84/615 |
| 2003/0188626 A1 | 10/2003 | Kriechbaum et al. | |
| 2004/0131200 A1 | 7/2004 | Davis | |
| 2005/0260978 A1 | 11/2005 | Rader et al. | |
| 2006/0180005 A1 | 8/2006 | Wolfram | |
| 2007/0028750 A1* | 2/2007 | Darcie | G10H 1/0058 84/625 |
| 2007/0039449 A1* | 2/2007 | Redmann | G10H 1/0058 84/609 |
| 2007/0140510 A1* | 6/2007 | Redmann | G10H 1/0058 381/97 |
| 2007/0245881 A1* | 10/2007 | Egozy | G10H 1/0016 84/609 |
| 2007/0261535 A1 | 11/2007 | Sherwani et al. | |
| 2008/0113797 A1* | 5/2008 | Egozy | A63F 13/12 463/35 |
| 2008/0165980 A1 | 7/2008 | Pavlovic et al. | |
| 2009/0066641 A1* | 3/2009 | Mahajan | A63F 13/10 345/156 |
| 2009/0071315 A1 | 3/2009 | Fortuna | |
| 2009/0320669 A1* | 12/2009 | Piccionelli | G10H 1/0058 84/609 |
| 2014/0254828 A1 | 9/2014 | Ray et al. | |
| 2014/0334644 A1 | 11/2014 | Selig et al. | |
| 2015/0143976 A1* | 5/2015 | Katto | A63F 13/211 84/602 |
| 2015/0179157 A1 | 6/2015 | Chon et al. | |
| 2016/0379611 A1 | 12/2016 | Georges et al. | |
| 2017/0005634 A1 | 1/2017 | Raz et al. | |
| 2017/0092247 A1 | 3/2017 | Silverstein | |
| 2017/0110102 A1* | 4/2017 | Colafrancesco | G10H 1/361 |
| 2017/0140743 A1 | 5/2017 | Gouyon et al. | |
| 2017/0357479 A1 | 12/2017 | Shenoy et al. | |
| 2018/0271710 A1 | 9/2018 | Boesen et al. | |
| 2018/0322854 A1 | 11/2018 | Ackerman et al. | |
| 2018/0349492 A1 | 12/2018 | Levy et al. | |
| 2019/0018644 A1 | 1/2019 | Kovacevic et al. | |
| 2019/0237051 A1 | 8/2019 | Silverstein | |

* cited by examiner

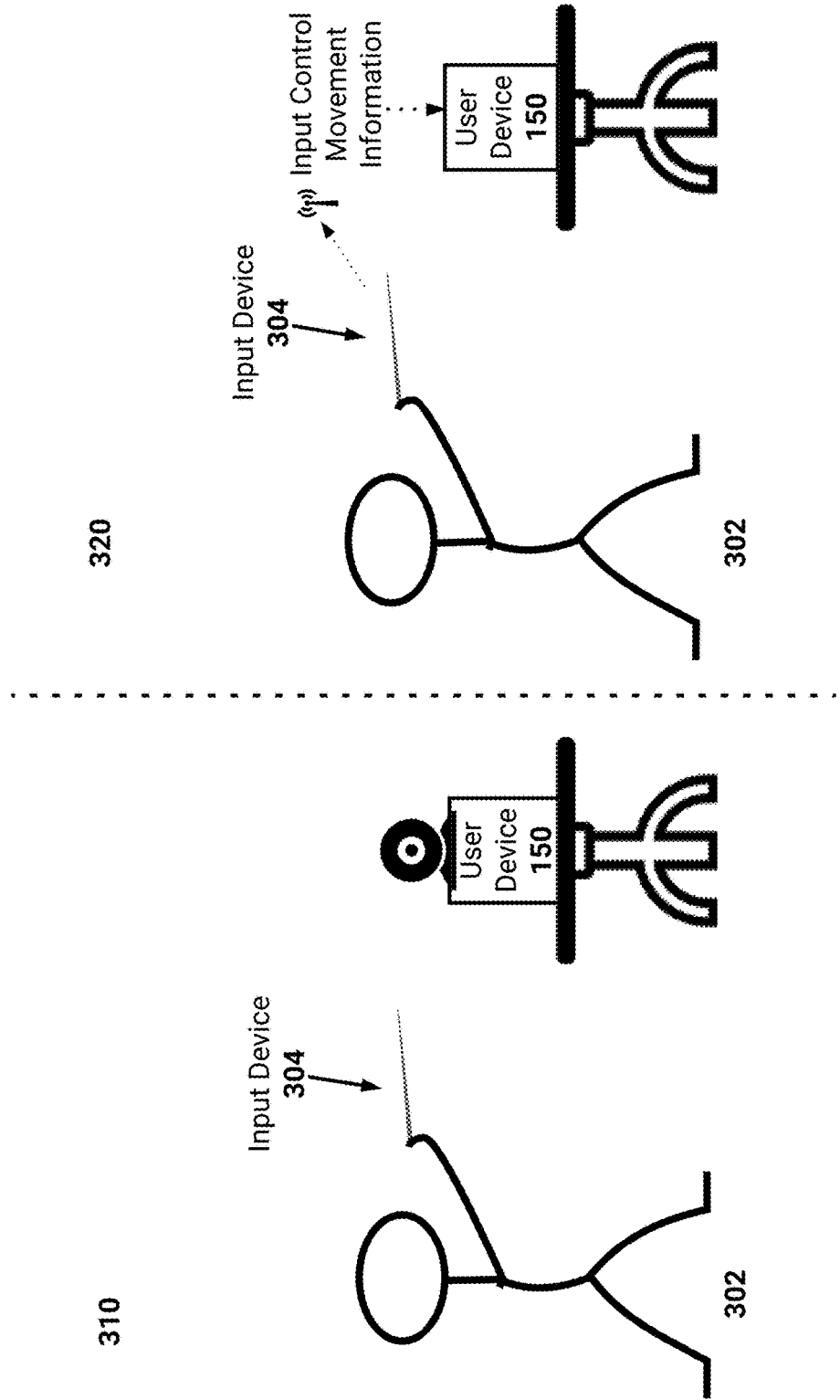

ENHANCED REAL-TIME AUDIO GENERATION VIA CLOUD-BASED VIRTUALIZED ORCHESTRA

TECHNICAL FIELD

The present disclosure relates to systems and techniques for generating audio. More specifically, this disclosure relates to improvements in generating realistic symphonic audio.

BACKGROUND

Current techniques to produce audio, such as for importation in electronic games, generally rely upon large-scale symphonic orchestras led by real-life conductors. The orchestra may be recorded during the performance, and the resulting recording utilized in an electronic game. While using a real-life orchestra may produce a pleasing output, it may be impractical to utilize such an orchestra in all situations in which symphonic audio is desired.

Another example scheme may include utilizing musical instrument digital interface (MIDI) software to generate audio from an input score. For example, the MIDI software may combine samples of instruments to generate an audio recording. However, these samples may sound mechanical due to the fixed nature of the samples. As an example, while a human player may interpret a portion of a score in a particular way, the MIDI software will combine the samples solely based on the notes in the score. Thus, at present such MIDI software is disfavored. Indeed, for certain movies, electronic games, and so on, a real-life symphony may be considered as a requirement. In this way, there is a need for a technological scheme to improve upon, and thus enhance, computer-based audio generation schemes. Such schemes may democratize the computer-based generation of realistic, and emotionally resonant, music.

SUMMARY OF CERTAIN EMBODIMENTS

Particular embodiments of the subject matter described in this specification can be implemented so as to realize one or more of the following advantages. The techniques described herein can enable improvements in generation of complex software-based audio. Examples of complex audio may include symphonic audio or other forms of musical audio (e.g., jazz). These example forms of musical audio may ordinarily require multitudes of real-life performers (herein also referred to as musicians). With respect to symphonic audio, there may be 10, 20, 120, and so on real-life performers required to perform a particular musical score. As will be described, the techniques described herein can enable the virtualization (e.g., simulation) of such real-life performers. Thus, symphonic audio can be readily generated through utilization of one or more systems. Additionally, the audio can be generated with enhanced expressiveness, emotion, and so on, as compared to prior software-based audio generation techniques.

Current techniques to simulate real-life instruments may rely upon musical instrument digital interface (MIDI) software. As an example, one or more MIDI controllers (e.g., a keyboard) may be utilized by a human performer to play portions of a score assigned to disparate instruments. Thus, the human performer may set, via the MIDI controller, a particular instrument to be played. The human performer may then play associated musical notes via the MIDI controller. As input to the MIDI controller is provided by the performer, samples (e.g., digital samples) of a particular instrument may be combined. For example, if the performer selects a particular note on the MIDI controller a sample of the particular note being played via the particular instrument may be accessed. The human performer may perform each portion of the score that would otherwise be performed by a specific real-life performer. With respect to a symphonic score, the human performer may thus perform portions of the score assigned to respective instruments required to perform the symphonic score. The resulting output audio for each instrument may be combined to produce an audio recording for the score.

As another example, a score may be ingested and audio automatically produced. In this example, a system may utilize time information associated with the score (e.g., a number of beats per minute, time signature, and so on) to trigger generation of audio samples for musical notes included in the score. As an example, a portion of the score may be assigned to a violinist. The system may analyze the score, such as metadata included with the score, to identify the musical notes included in the portion. The system may then utilize violin samples to generate audio corresponding to the musical notes and associated time notes (e.g., quarter note, eighth note, and so on). In this way, the system may aggregate samples for the instruments required to perform the score. The aggregated samples may thus represent an audio recording for the score.

It should be appreciated, however, that such schemes, while common place, may be inadequate for certain use cases. For example, the MIDI controller may be inadequate to create realistic sounding audio. Indeed, while a keyboard-based MIDI controller may be utilized to produce audio for a violin, a human performer will merely be able to select the notes to be played via the MIDI controller. In contrast, a human performer playing a violin has a much richer set of techniques to play his/her violin. As an example, subtle plucking of the strings may be utilized. As another example, the technique for which the human player moves his/her fingers about the fret board may adjust the resulting sound of the violin. Given the technical underpinnings of MIDI, in which messages specifying notation, pitch, velocity, vibrato, panning, and a clock are utilized, the MIDI controller may be unable to produce a convincing facsimile of a real-life symphonic performer.

In this way, the combining of MIDI samples (e.g., the gluing together of waveforms) may provide reduced subtlety, emotion, and so on, as compared to real-life performers. Advantageously, as will be described a system (e.g., a cloud-based system) may enable the real-time simulation of performers playing simulated instruments. For example, the system may receive a musical score and cause the realistic simulations of (1) a performer's actions, playing style, and so on, and (2) the application of the performer's actions to a simulated instrument. With respect to a violin, the system may simulate techniques which a real-life player would utilize to play a portion of a score. As an example, the system may simulate distinct bowing motions which a real-life player may utilize. These bowing motions may be based on learned movements of players and may also be based on notations or annotations within the score itself. For example, the score may indicate notations such as pianissimo, hairpins, sforzando, and so on. The system may similarly then utilize these simulated techniques to generate resulting violin audio.

Furthermore, to increase an extent to which the system may generate realistic audio, a user may function as a conductor to the simulated performers. As will be described, the user (e.g., a real-life person) may provide input to the system representing conductor cues. Examples of conductor cues may include real-time indications of beat and tempo, indications of dynamics (e.g., variations in loudness), cueing of certain instruments or groups of instruments, articulation (e.g., staccato or legato playing), and so on. The system may optionally monitor the user's hand movements (e.g., via a video input device) or may optionally receive movement information generated by a baton or gloves utilized by the user. Thus, the conductor cues corresponding to these movements may be utilized by the system during simulation of the performers. In this way, the user may have a real-time (e.g., substantially real-time) control over the simulated performers. Advantageously, the user may receive real-time audio feedback (e.g., substantially real-time). Due to this real-time audio feedback, the user may conduct the simulated performers similar to that of conducting a real-life group of performers (e.g., an orchestra, a jazz band, and so on).

Thus, the techniques described herein improve upon the functioning of prior schemes to generate audio. As described above, prior schemes lacked the technical ability to generate emotionally resonant, and realistic, audio. In contrast, the system described herein generates realistic audio via real-time simulations of performers playing instruments. Additionally, using input received from a real-life user, subtle variations and emotions in the simulated performers can be produced.

The systems, methods, and devices of this disclosure each have several innovative aspects, no single one of which is solely responsible for the all of the desirable attributes disclosed herein.

One embodiment discloses a computer-implemented method comprising by a system of one or more computers, receiving, from a user device, a request to generate output audio associated with a musical score; simulating, based on one or more machine learning models, actions associated with virtual musicians with respect to respective instruments during performance of the musical score; receiving user input comprising conductor cues during the performance of the musical score, wherein the simulated actions associated with a virtual musician are indicative of the virtual musician performing the musical score based, at least in part, on the conductor cues; and generating output audio to be provided to the user device, the output audio being generated based on the simulated actions by the virtual musicians.

Various embodiments of the method may include one, all, or any combination of the following features. The generated output audio is provided to the user device in substantially real-time, such that the user may provide the user input to adjust the simulated actions during performance of the musical score. The conductor cues are based on movement of a user's hands or an input device during performance of the musical score. A conductor cue indicates a particular tempo, a particular beat, an adjustment of articulation, or an adjustment of dynamics. The simulated actions indicate key-features associated with a playing style. The simulated actions represent continual actions generated via the one or more machine learning models, the continual actions representing expected actions a real-world musician would perform on an instrument. Generating output comprises generating audio associated with each of the instruments and aggregating the generated audio. Generating audio associated with a particular instrument comprises: accessing information describing a physical model of the particular instrument, the physical model representing geometric and/or structural characteristics of the particular instrument; applying the simulated actions associated with the particular instrument; and generating audio based on the application. Generating audio associated with a particular instrument comprises: accessing multitudes of musical instrument digital interface (MIDI) samples associated with the particular instrument, the MIDI samples being associated with labels representing aspects of a playing style; selecting, based on the simulated actions associated with the particular instrument, MIDI samples; and generating audio based on the selected MIDI samples.

Some aspects feature a system comprising one or more computers and non-transitory computer storage media storing instructions that when executed by the one or more computers, cause the one or more computers to perform operations comprising: receiving, from a user device, a request to generate output audio associated with a musical score; simulating, based on one or more machine learning models, actions associated with virtual musicians with respect to respective instruments during performance of the musical score; receiving user input comprising conductor cues during the performance of the musical score, wherein the simulated actions associated with a virtual musician are indicative of the virtual musician performing the musical score based, at least in part, on the conductor cues; and generating output audio to be provided to the user device, the output audio being generated based on the simulated actions by the virtual musicians.

Various embodiments of the system may include one, all, or any combination of the following features. The conductor cues are based on movement of a user's hands or an input device. Wherein a conductor cue indicates a particular tempo, a particular beat, an adjustment of articulation, or an adjustment of dynamics. The simulated actions indicate key-features associated with a playing style. The simulated actions represent continual actions generated via the one or more machine learning models, the continual actions representing expected actions a real-world musician would perform on an instrument. Generating output comprises generating audio associated with each of the instruments and aggregating the generated audio. Generating audio associated with a particular instrument comprises: accessing multitudes of musical instrument digital interface (MIDI) samples associated with the particular instrument, the MIDI samples being associated with labels representing aspects of a playing style; selecting, based on the simulated actions associated with the particular instrument, MIDI samples; and generating audio based on the selected MIDI samples.

Some aspects feature non-transitory computer storage media storing instructions that when executed by a system of one or more computers, cause the computers to perform operations comprising: receiving, from a user device, a request to generate output audio associated with a musical score; simulating, based on one or more machine learning models, actions associated with virtual musicians with respect to respective instruments during performance of the musical score; receiving user input comprising conductor cues during the performance of the musical score, wherein the simulated actions associated with a virtual musician are indicative of the virtual musician performing the musical score based, at least in part, on the conductor cues; and generating output audio to be provided to the user device, the output audio being generated based on the simulated actions by the virtual musicians.

Various embodiments of the non-transitory computer storage media may include one, all, or any combination of the following features. The conductor cues are based on movement of a user's hands or an input device. Generating output comprises generating audio associated with each of the instruments and aggregating the generated audio. Generating audio associated with a particular instrument comprises: accessing multitudes of musical instrument digital interface (MIDI) samples associated with the particular instrument, the MIDI samples being associated with labels representing aspects of a playing style; selecting, based on the simulated actions associated with the particular instrument, MIDI samples; and generating audio based on the selected MIDI samples Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 3A illustrates a representation of a user providing conductor cues via different user input schemes.

Like reference numbers and designations in the various drawings indicate like elements.

DETAILED DESCRIPTION

Overview

Figure 1:
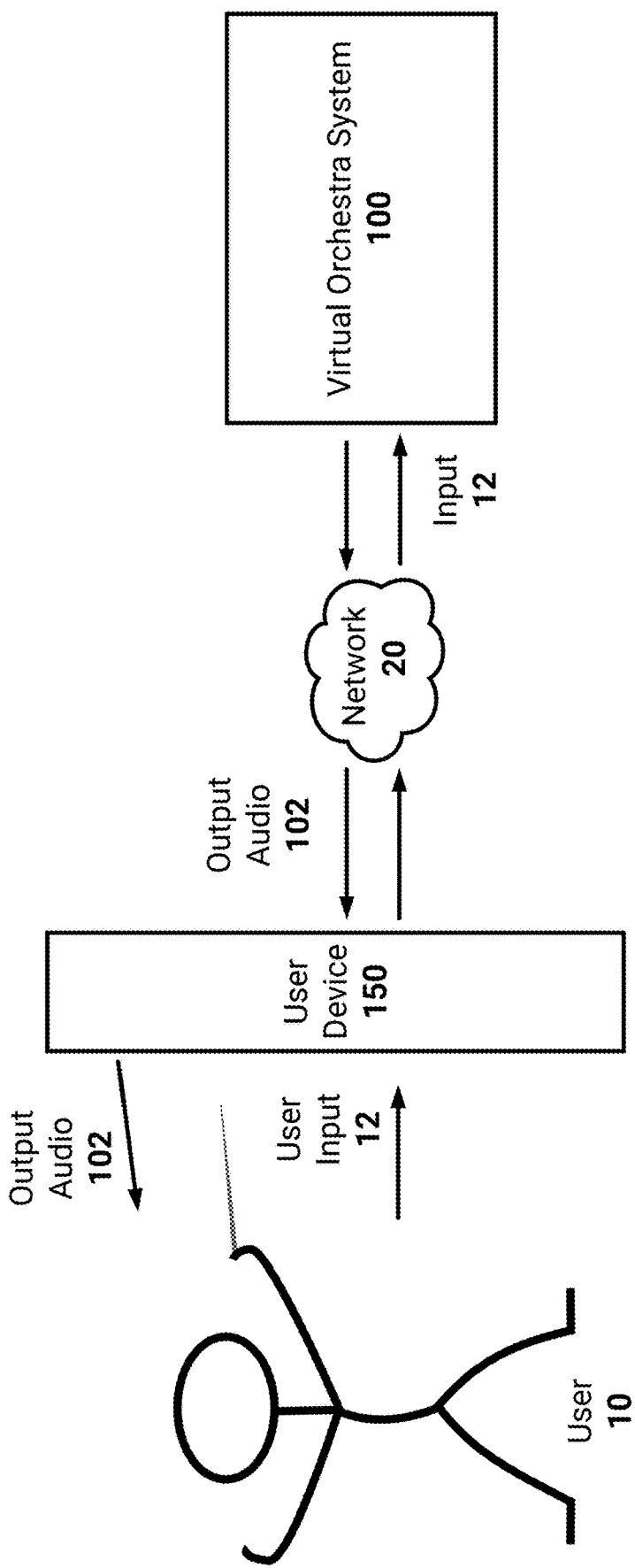
FIG. 1 is a block diagram illustrating a user providing input to a virtual orchestra system as described herein.

This specification describes techniques to generate an audio recording of a musical score (herein referred to as a score) based on real-time conductor cues provided by a user to a group of virtual musicians simulated by a system (e.g., a cloud-based system, such as the virtual orchestra system 100). As will be described, the user may provide user input to a user device representing conductor cues associated with conducting a score. The system may utilize the conductor cues to, at least in part, simulate virtual musicians playing the score using respective instruments. As will be described, the system may utilize machine learning techniques to simulate the playing. Based on the simulated playing, the system may generate audio corresponding to respective instruments of the simulated virtual musicians. For example, the audio may be generated based on musical instrument digital interface (MIDI) samples. As another example, the audio may be generated based on the simulated playing being applied to realistic models of each instrument (e.g., physical models, such as simulated physical models). For example, the audio may be generated based on physics first principles. The generated audio associated with each virtual musician may be aggregated and provided to the user device for output. Advantageously, the system may generate the audio in real-time. In this way, the user may conduct the simulated virtual musicians in real-time, and hear corresponding real-time audio via his/her user device.

In this specification, a "conductor cue" may comprise any direction which would be utilized by a musician to play an instrument while performing a particular score. An example of a conductor cue may include an indication of a tempo and beat. In this example, a user may perform a particular movement of his/her hand indicating beats (e.g., up beats, down beats, and so on) and tempo. Another example of a conductor cue may include cueing of certain instruments or groups of instruments. In this example, the user may specify when a particular instrument (e.g., violin), or a group of instruments (e.g., brass instruments, or a user-specifiable group), is to begin playing. Another example of a conductor cue may include an indication of articulation. In this example, the user may adjust tension of his/her hand or hands, or may provide other input (e.g., verbal input, input to a device, and so on).

As will be described, a user may provide, or otherwise cause selection of, a score to be utilized by the system. Advantageously, the user may annotate the score to indicate particular preferences associated with the score being played. For example, the user may indicate that a portion of the score is to be played at a lower tempo. As another example, the user may indicate certain emotions that are to be achieved via portions of the score. It should be appreciated that a real-life conductor may provide substantial notes and instruction regarding a score to a group of musicians (e.g., an orchestra). These notes and instruction may inform the conductor's preferred sound, and emotive response, that are to be achieved during performance of the score. For example, the conductor may prefer that a portion of a score be played with a happy style. Similarly, the user may annotate the score to indicate such notes and instructions. As will be described below, the system may utilize these annotations to inform simulation of the virtual musicians.

Utilizing one or more input schemes, the user may provide user input to his/her user device associated with conductor cues. For example, the user may provide user input indicating initiation of the score, and then provide conductor cues as described above. As an example of providing user input, the user device may include, or have access to, a video input device (e.g., a camera). The user device may thus obtain video, or periodic images, of the user. A portion of the user's body (e.g., his/her hands), or an input device held by the user, may be utilized to provide the conductor cues. As another example, the user device may obtain wireless information representing movement of one or more of the user's hands. In this example, the user may utilize an input device (e.g., a baton) that provides movement information to the user device. Optionally, the user may wear gloves that provide information indicating movement of the hands. The input device and/or gloves may optionally include one or more sensors (e.g., accelerometers, an inertial measurement unit, and so on), wireless functionality (e.g., Bluetooth), and so on. Thus, as the system simulates the virtual musicians, the user may provide conductor cues to adjust, and inform, the simulation.

As will be described, the system may simulate virtual musicians based on one or more machine learning techniques. For example, the system may simulate actions a musician (e.g., real-world musician) would be expected to perform on an instrument. As an example, the system may be trained utilizing video of performers playing particular scores. As another example, the system may be trained based on key-features of performers playing particular scores (e.g., information identifying adjustments in playing style, tempo, and so on). Thus, in this specification, an action may be associated with a playing style and may include specific actions performed by performers (e.g., specific finger movements, fingering patterns,) and/or may include specific key-features associated with a playing style (e.g., transition speeds between notes, articulation, and so on). Additionally, the scores may include metadata indicating particular annotations that the system is to learn to recognize. For example, the system may be trained to learn how to express sadness via labeled training data associated with a musician (e.g., real-world musician) playing with this emotion. Examples of sadness may include particular adjustments in tempo, techniques to play the instrument (e.g., bowing techniques, adjustments in speed between note transitions, and so on). The simulation may be further adjusted based on the conductor cues. For example, the system may adjust a tempo at which simulated virtual musicians are playing respective instruments based on a conductor cue. As another example, the system may simulate a virtual musician adjusting a loudness produced by an instrument based on one or more conductor cues.

Based on the above-described simulated actions, the system may generate audio. With respect to a virtual violin musician, the system may generate audio corresponding to a violin being played. As will be described, the system may optionally utilize a simulated physical model of an instrument to generate the audio. For example, the system may have access to physical models of instruments. In the example of a violin, the physical model may thus indicate the geometric characteristics of a violin (e.g., resonant cavity geometry, strings, and soon) and the structural characteristics of the violin (e.g., wood type, string type, other materials utilized in the violin, and so on). Additionally, the physical model may indicate the geometric characteristics, structural characteristics, and so on, of a bow utilized to play the violin. Thus, the system may apply the simulated actions a violin player would perform to the violin model. The system may therefore simulate the resulting sound which would be generated by such actions on a violin. For example, the system may simulate the sound from first principles, such as via utilization of the wave equation, the geometric characteristics, structural characteristics, and so on.

Optionally, the system may utilize MIDI samples associated with a violin. Since there may be multitudes of different MIDI samples for a violin, the system may advantageously select samples to correspond to the simulated actions. As described above, prior schemes may not enable subtle adjustments to playing style (e.g., subtle bowing differences). In contrast, the system may utilize the simulation actions of a virtual violin musician to determine such realistic adjustments to playing style. The system may thus select MIDI samples to be utilized which correspond to these different playing styles. Optionally, the system may adjust existing MIDI samples based on the simulated actions. For example, if system simulates that a virtual musician may move from a first bowing style to a second bowing style, the system may adjust MIDI samples to better correspond to the second bowing style. To effectuate this adjustment, the system may utilize machine learning techniques that are trained on disparate bowing styles. Thus, the system may utilize the machine learning techniques to adjust the underlying audio waveforms to the second bowing style.

The generated audio, such as the underlying generated waveforms, may be utilized by the system to generate output audio for presentation via the user device. The system may generate the output audio based on simulated placement of instruments within a music hall. For example, the user may optionally select a particular music hall. As another example, the user may optionally select locations of audio recording devices (e.g., microphones) within a music hall. As another example, the user may optionally select locations within a music hall which the simulated instruments are to be located. The system may thus combine the generated audio associated with the simulated instruments based on the above-described selections. The resulting output audio may then be transmitted to the user device to be presented via one or more output devices (e.g., speakers). Optionally, the output audio may be provided as a mono output, stereo output, surround sound, and so on. Additionally, upon completion of the score the user device, or system, may generate an audio recording that encompasses the entirety of the output audio for the score.

Since the system can generate real-time output audio, the user may conduct the virtual musicians similar to that of real musicians. As will be described below, with respect to at least FIGS. 3A-3C, the user may view a user interface associated with the simulation. The user interface may optionally graphically illustrate the virtual musicians. For example, three-dimensional models of virtual musicians may be presented in the user interface as generated (e.g., rendered) by the system. These three-dimensional models may then be adjusted by the system based on simulated actions associated with playing instruments. The user may thus provide conductor cues to the illustrated virtual musicians (e.g., specific virtual musicians or all virtual musicians). The user interface may optionally graphically illustrate instruments utilized to perform the score. For example, instead of presenting graphical representations of virtual musicians playing instruments, the user interface may present graphical representations of the instruments. Similar to the above, the user may cause selection of particular instruments, or groups of instruments, and provide conductor cues to be utilized by the system when generating audio for the selected instruments.

It should be appreciated that use of real-time may refer to substantially real-time. For example, the user may provide a conductor cue associated with increasing a tempo. The user device may receive user input associated with the conductor cue and provide the user input to the system via a network (e.g., the internet). The system may then utilize the conductor cue to adjust the simulation of the virtual musicians (e.g., increase a tempo at which the virtual musicians are simulated to be playing). The system may generate output audio and provide the output audio to the user device (e.g., via the network). In this way, there may be a certain lag or threshold time from when the user provides a conductor cue to when output audio is received by the user. However, advantageously the lag or threshold time may be less than a certain threshold such that the user may perceive the conductor cues as updating the output audio similar to that of real-life musicians.

Example Block Diagrams

FIG. 1 is a block diagram illustrating a user 10 providing user input 12 to a virtual orchestra system 100 as described herein. As described herein, a user 10 may utilize a user device 150 to cause the generation of output audio 102 associated with a score provided, or otherwise selected by, the user 10. The user 10 may provide user input 12 to the user device 150 associated with conductor cues, and the user device may provide the user input 12 to the virtual orchestra system 100. As will be described, the virtual orchestra system 100 may simulate virtual musicians performing the score and generate the output audio 102 based on the simulations.

The virtual orchestra system 100 may be a system of one or more computers, one or more virtual machines executing on a system of one or more computers, and so on. For example, the virtual orchestra system 100 may be a cloud-based system, or server system, which is responsive to user input received from one or more user devices. These applications may be accessed via user devices over a network (e.g., the internet), however the functionality afforded by these applications may appear to be from locally installed applications. As an example, a web application may provide functionality to edit documents. In this example, a user device may utilize a user interface to provide user input directed to a cloud-based system. The user interface may optionally be generated at least in part by a cloud-based system, and the user input may cause the cloud-based system to update the user interface. In this way, a user may utilize a user device to edit documents via user input provided to a back-end cloud-based system (e.g. hosting the web application).

Similar to the above, the virtual orchestra system 100 described herein may be an example of a system which provides audio generation functionality to users of the system. The virtual orchestra system 100 may thus enable the user 10 to utilize the user device 150 to access the audio generation functionality. As will be described, users may provide scores to be performed by the virtual orchestra system 100. The system 100 may thus service multitudes of users at a same time, for example via simulation of virtual musicians in respective virtual machines, processes, or instances of underlying web applications.

As illustrated in FIG. 1, the user 10 is utilizing the user device 150 to provide user input 12 to the virtual orchestra system 100 via a network 20. User input 12 may include adjustment or manipulation of the user's 10 hands, an input device (e.g., a baton), and so on as will be described. The user device 150 may be a mobile device (e.g., a tablet, a smart phone), a laptop or other computer, a thin client (e.g., a display with limited computing functionality), and so on. With respect to the mobile device, optionally the mobile device may be a wearable device (e.g., a smart watch). In this example, the user 10 may wear a smart watch, and movement of the smart watch may be utilized as the user input 12.

The user may utilize the user device 150 to select a particular score to be performed. For example, the user may cause a score to be stored on the user device 150. In this example, the user device 150 may provide the stored score to be provided to the virtual orchestra system 100. As another example, the user may select from amongst a multitude of scores. In this example, the virtual orchestra system 100 may receive the selection, and obtain an associated score (e.g., from a database, from a network location, and so on). Without being constrained by theory, it should be appreciated that the virtual orchestra system 100 may utilize a score provided in any file format. Examples of file formats may include MusicXML (e.g., an XML based file format), MIDI, a .pdf of a score, and so on. With respect to the .pdf, the virtual orchestra system 100 may perform one or more character recognition processes. For example, the system 100 may apply an optical music recognition process to recognize the musical notes, time information, expression information, and so on, which is present within the score. As another example, the system 100 may apply an optical character recognition process to obtain any annotations or notes which may be included in the score. Examples of the virtual orchestra system 100 utilizing annotations or notes are described in more detail below.

The virtual orchestra system 100 may utilize the selected score to simulate virtual musician's performing the score via respective instruments. The system 100 may thus identify the types of instruments which are to be simulated. For example, the score may comprise different portions. Each of these portions may be associated with a particular instrument. As another example, the user 10 may indicate which instruments are to be utilized. For example, using a user interface presented via the user device 150 the user 10 may specify the types of instruments to be simulated and associated quantities. The user device 150 may optionally graphically depict the score. The user 10 may then indicate portions of the score corresponding to different instruments.

Additionally, the user 10 may adjust the type of instruments which are to be simulated by the system 100. For example, a portion of the score may indicate that it is to be performed by a first type of instrument (e.g., oboe, bassoon, violin, and so on). The portion may indicate the first type of instrument via written text, via metadata associated with the score, and so on. The user 10 may provide user input 12 to the user device 140 indicating that the portion is to be performed by a second type of instrument. Advantageously, the user device 150 or virtual orchestra system 100 may optionally transpose the portion to reflect the second type of instrument. Thus, the virtual orchestras system 100 may simulate a virtual musician performing the portion with the second type of instrument.

In addition to causing selection of the instruments to be simulated, the user 10 may select one or more parameters associated with generation the output audio 102. An example parameter may include a particular music hall in which the generated output audio 102 is to be simulated. The user device 150 may enable, via a user interface, selection of a particular music hall. As will be described, the virtual orchestra system 100 may utilize geometry information associated with the selected music hall to generate output audio 102. For example, the system 100 may simulate audio produced by the selected instruments, and then position the simulated audio within the selected music hall. Another example parameter may include positions of the virtual musicians. For example, the user 10 may prefer that certain types of instruments be simulated as being located behind certain other types of instruments. Optionally, the user 10 may indicate particular volume, or loudness, thresholds for each type of instrument. Thus, the user 10 may cause the system 100 to mix the audio associated with the simulated instruments based on these thresholds.

To initiate performance of the score, the user 10 may provide particular user input 12 to the user device 150. For example, the user device 150 may present a representation of virtual musicians or representations of instruments. In this example, the user input may include movement of one or more of the user's 10 hands with respect to the presented representation. Examples of movement may include pointing at the representation, raising the user's hands, and so on. As will be described, the user device 150 may obtain images, or video, of the user 10. In this way, the user device 150 may utilize computer vision techniques to identify that the user 10 is pointing at the representation. Since movement of the user's 10 hands may correspond with actions commonly taken by conductors with respect to real-life orchestras, the user 10 may rely upon commonly established techniques to indicate initiation of a performance. As another example of user input 12, the user 10 may verbally indicate that the score is to be performed. In this example, the user device 150 may utilize an audio input device (e.g., a microphone) to obtain a verbal command associated with initiation. Furthermore, the user 10 may provide user input to indicate arbitrary starting and/or stopping points within the score. As an example, the user 10 may indicate that the score is to be temporarily stopped. The user 10 may then indicate that performance of the score is to be initiated from the temporarily stopped position within the score. As another example, the user 10 may start the performance at the score at the midpoint of the score and then stop the performance prior to the end of the score. The user 10 may then start the performance at the stopping point or begin at any other part of the score.

Subsequent to initiation, the user 10 may provide user input 150 associated with conductor cues to control, at least in part, the virtual musicians. For example, the user 10 may utilize a first hand to indicate tempo, beat, and so on. The user 10 may additionally utilize a second hand to indicate other expressive aspects of musicianship. By way of example, the second hand may point to a particular instrument, or group of instruments, and provide conductor cues (e.g., via movement of the second hand). The virtual orchestra system 100 may then simulate the virtual musicians associated with the particular instrument, or group of instruments, based on the provided conductor cues. Additional examples of providing user input will be described in more detail below, with respect to at least FIGS. 3A-3C.

As will be described in more detail below, with respect to at least FIG. 2A, the virtual orchestra system 100 may thus generate output audio 102 for auditory presentation to the user 10. The virtual orchestra system 100 may simulate actions which real-life musicians may perform with respect to instruments. For example, the virtual orchestra system 100 may utilize machine learning techniques trained based on actions of musicians (e.g., real-world musicians) while playing different scores. Thus, based on the score selected by the user 10, the virtual orchestra system 100 may simulate virtual musicians. As the score proceeds, for example as the system 100 simulates virtual musicians playing notes of the score (e.g., based on a tempo), the system 100 may thus generate simulated actions associated with the virtual musicians. Example actions may include playing an instrument in a certain technical style, playing successive musical notes with varying speed, loudness, intensity, and so on.

These generated actions may be utilized to generate audio information for respective instruments. For example, the system 100 may simulate actions a violinist may perform while performing a portion of the selected score. To generate audio, the system 100 may then apply the actions to a simulated violin. As will be described, the system 100 may utilize a model of a violin and provide input to the model corresponding to the simulated actions. Thus, if the simulated actions include playing the violin with a particular bowing style, the system 100 may recreate the particular bowing style on the model of the violin. As an example, the system 100 may utilize manipulate a model of a bow across modeled strings of a violin. Sound may thus be simulated, and utilizing geometry associated with the modeled violin, resonant sound may be simulated. In this way, the system 100 may thus generate audio corresponding to the violin.

The above-description references the system 100 simulating actions of one or more virtual musicians, and then applying the simulated actions to respective instruments of the virtual musicians. For example, a simulated action may indicate a particular bowing motion for the virtual orchestra system 100 to simulate. However, it should be appreciated that the system 100 may generate audio utilizing MIDI samples. As is known, there may be a plethora of different MIDI samples corresponding to a same instrument (e.g., hundreds, thousands, and so on). For example, a set of MIDI samples may correspond to an instrument being played in a certain style. The virtual orchestra system 100 may utilize the simulated actions to select, or modify, particular MIDI samples. For example, MIDI samples may be associated with different labels indicating information associated with a playing style.

As an example of adjustment of MIDI samples, the system 100 may simulate an action associated with decreasing a speed associated with transitioning to subsequent musical notes. With respect to a string instrument, the system 100 may adjust MIDI samples to more closely adhere to a virtual musician sliding a finger from a first fret to a second fret based on the decreased speed. As an example of selecting MIDI samples, an action may indicate a particular bowing style of a violin. Thus in this example, the system 100 may utilize MIDI samples corresponding to violins being played in the particular bowing style. In this way, the system 100 may provide an expressiveness, and richness of musical language, which was not possible utilizing pure MIDI-based schemes.

As described above, the virtual orchestra system 100 may additionally utilize the user input 150 when simulating actions of virtual musicians. For example, the user 10 may provide user input 150 associated with a conductor cue to cause an increase in loudness of certain instruments. Thus, the system 100 may correspondingly increase the loudness, intensity, and so on, of the simulated actions.

Figure 2A:
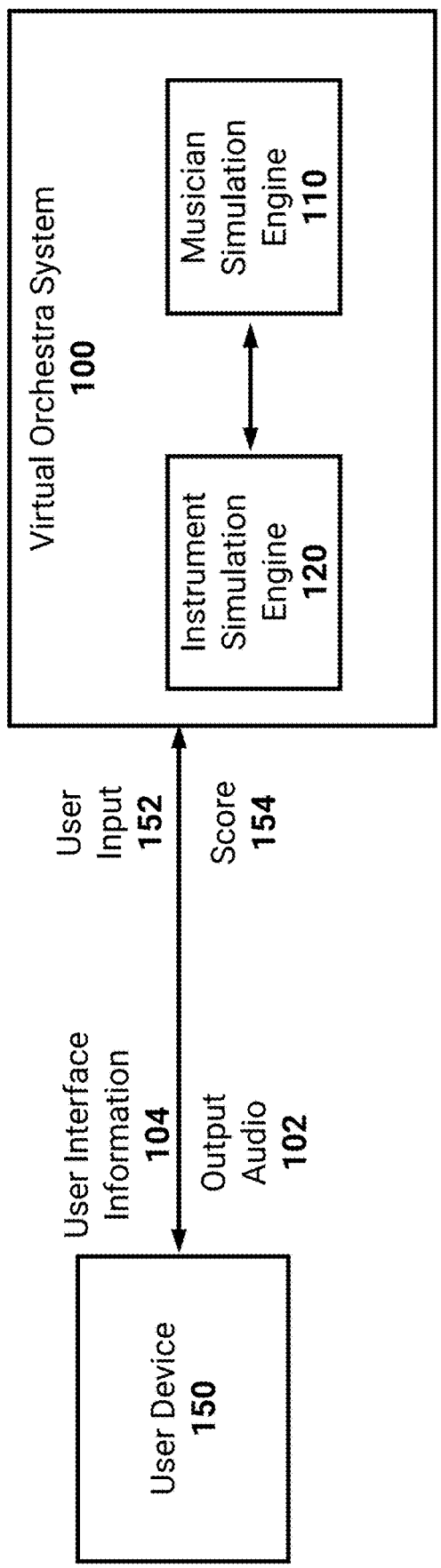
FIG. 2A is a block diagram of an example virtual orchestra system in communication with a user device.

FIG. 2A is a block diagram of an example virtual orchestra system 100 in communication with a user device 150. The virtual orchestra system 100, as described above, may generate output audio 102 associated with a score 154 via simulations of performers and instruments. As illustrated, the virtual orchestra system 100 includes a musician simulation engine 110 and an instrument simulation engine 120. It should be appreciated that these engines 110, 120 may comprise different systems, different virtual machines, different web applications, and so on, which are associated with the virtual orchestra system 100. Optionally, the engines 110, 120 may form part of a same application (e.g., web application), with a first part of a processing pipeline (e.g., the musician simulation engine 110) providing information to a second part of the processing pipeline (e.g., the instrument simulation engine 120).

As described in FIG. 1, the user device 150 may present a user interface to a user associated with conducting virtual musicians. The user interface may be generated, at least in part, by the virtual orchestra system 100. For example, the user device 150 may execute an application that presents, at least in part, user interface features received from the virtual orchestra system 100. Optionally, the application may render the user interface presented via the user device 150, and the user interface may be updated based on information received from the virtual orchestra system 100. As an example, the virtual orchestra system 100 may provide information indicating that a particular graphical element (e.g., a virtual musician) is to be rendered in according to particular information (e.g., the information may indicate a virtual musician is bowing a cello). Thus, the application may render the virtual musician according to the particular style. Optionally, the application may be obtained from an electronic application store (e.g., an 'app'). In some embodiments, the user device 150 may access a web page associated with the virtual orchestra system 100. The system 100 may provide user interface information for rendering via a browser executing on the user device 150. Additionally, user input may be directed to the user web page and routed to the virtual orchestra system 100 for processing. In this way, a thin client may be utilized as the user device 150.

The user device 150 may thus be in communication with the virtual orchestra system 100, such as to provide user input 152 and information indicating selection of a score 154. With respect to user input 152, as described in FIG. 1 the user input 152 may reflect conductor cues provided by a user of the user device 150. For example, the user of the user device 150 may indicate that the virtual orchestra system 100 is to initiate performance of the score 154 (e.g., initiate simulation of the virtual musicians). As will be described in more detail, the virtual orchestra system 100 may generate output audio 102 to be presented to the user (e.g., in substantially real-time). Thus, the user may utilize conductor cues to adjust the simulation. As described above, a conductor cue may cause certain virtual musicians to play with greater emphasis, or with a particular emotion. Simulating a virtual musician playing with a particular emotion is described in more detail below.

Optionally, the user device 150 may provide the user input 152 to the virtual orchestra system 100 for processing. In implementations in which the user device 150 comprises a video input device, the user input 152 may be provided as successive frames of captured video of the user. Thus, the virtual orchestra system 100 may utilize computer vision techniques to extract movement of the user's hands or an input device (e.g., a baton). As an example, the system 100 may utilize machine learning techniques (e.g., a neural network) to identify the human's hands. The system 100 may then determine movement of the hands using kinematic modeling of the hands (e.g., the system may track points, or features of the hand such as fingers).

In some embodiments the user device 150 may receive movement information generated by an input device (e.g., a baton, a wearable device). For example, the input device may be in communication with the user device 150 via a wireless or wired connection. In these embodiments, the user device 150 may provide the movement information to the virtual orchestra system 100 for processing. As an example, the movement information may indicate an adjustment in position along one or more axes, acceleration information, and so on.

The user input 152 may optionally be processed by the user device 150 to reflect conductor cues. For example, the user device 150 may analyze images or video of the user, or movement information associated with an input device. The user device 150 may then generate conductor cues based on the analyses. In this way, the user device 150 may provide specific conductor cues to the virtual orchestra system for utilization. Optionally, in lieu of determining conductor cues based on the user input 152, the user of the user device 150 may verbally provide conductor cues. For example, the user may provide a verbal command associated with adjusting a playing style (e.g., 'play legato').

A conductor cue may be determined from user input based on machine learning techniques. For example, movement patterns of real-life conductors may be analyzed and utilized to train machine learning models. An example machine learning model may include a neural network (e.g., a recurrent neural network). In this example model, the neural network may be trained to label certain types of movement. As an example, the neural network may learn to recognize an adjustment in ictus (e.g., an adjustment in a rhythmical stress), adjustment of tension of the hands, and so on, as corresponding to adjustments in articulation. An example of adjustment in articulation may include an increase in tension corresponding to a conductor cue associated with playing staccato. As another example, adjustments in phrasing may be indicated by the user performing overhead arcs.

Optionally, an example machine learning model may be trained based on movement information of one or more features or points of the user or input device. For example, the machine learning model may be trained via adjustments in position, velocity, acceleration, and so on, of these features or points. Examples features or points may include one or more portions of the user's hands (e.g., fingers, palm, back of the hand, and so on). Example features or points of the input device may include a tip of the input device (e.g., a tip of a baton), or points along a length of the input device (e.g., points along the baton).

Thus, specific features or points of the user or input device may be monitored. Movement associated with these features or points may thus be learned to be classified as corresponding to specific conductor cues. However, it should be appreciated that a conductor may indicate conductor cues via other techniques than movement of his/her hand or baton. For example, the conductor may express that an emotion is to be achieved by the virtual musicians via expressions on his/her face. As another example, a tightening or constriction of the hand may correspond to adjustments in playing style. Thus, optionally an indication of emotion may be determined based on an adjustment of the user's face. For example, images or video of the user may be utilized to ascertain adjustments in emotions. A machine learning model may learn to recognize features corresponding to certain emotions. For example, a raising of the eyebrows may correspond to increasing an intensity of playing. Therefore, conductor cues may optionally be based on movement information of the user's hands or input device and other techniques (e.g., adjustments to the user's face, hands, and so on).

In addition to the above-described conductor cues, the user may specify time information associated with the score 154. For example, the user may utilize a certain hand, or a certain input device, to sketch out the tempo to be simulated. The user may also sketch out the beats associated with a time signature of the score 154. In this way, the user may perform adjustments to the tempo to cause the virtual orchestra system 100 to slow down, or increase, a speed at which notes are played by virtual musicians. Similarly, the user may emphasize certain beats more than other beats via adjustments in the user's hands or input device. As an example, in 4/4 time the user may more dramatically move the user's hand or input device when a particular beat in 4/4 time is played. Thus while the user input 152 may indicate a tempo at which the score 154 is to be simulated, for example via continual movement of the user's hands or input device, this tempo may be referred to as a conductor cue. In this way, continuous, or substantially continuous, movement may be utilized to generate discrete conductor cues.

While the above described examples of conductor cues, it should be appreciated that additional conductor cues may be utilized. Additionally, the user may cause a training session to be performed prior to the virtual orchestra system 100 simulating the score 154. The training session may enable the user to provide certain preferred movements, adjustments in expressiveness, and so on, and indicate an associated conductor cue. For example, the user may move his/her hand upward sharply and specify that this movement corresponds to an adjustment in articulation. To specify the conductor cue, the user may provide a verbal command indicating the cue. Optionally, the user device 150 may present an adjustment in sound which may be achieved via the conductor cue. For example, the virtual orchestra system 100 may simulate the adjustment. The user may specify a score 154 for the system 100 to simulate during this training period, or the user may indicate that the virtual musicians are to play a repeating short loop of musical notes.

FIG. 2A illustrates the virtual orchestra system 100 as including the musician simulation engine 110 referenced above. The musician simulation engine 110 may simulate actions which each virtual musician may perform during performance of the score 154. These simulated actions may thus be based on a portion of the score 154 each virtual musician is playing. The simulated actions may additionally be based on the received user input 152 from the user device 150. To simulate actions, the musician simulation engine 110 may utilize machine learning models trained based on real-life musicians performing different scores.

It should be appreciated that actions of real-life musicians may be extracted from different sources. For example, video of musicians may be utilized to monitor specific movements of the musician's hands. As another example, musicians may wear gloves that may monitor movement information of their hands. The hand movements may be correlated with specific musical notes being played in a score. Thus, as a musician plays a particular score the movement of the musician's hands may be monitored and utilized to train a machine learning model. Additionally, features of the movement may be learned (e.g., key-features). For example, a speed associated with transitions between notes may be learned. As another example, an extent to which a musical note is allowed to ring may be learned. Subtle variations in playing speed, for example variations which are not existent in the score itself, may be learned. As another example, the machine learning models may learn to recognize techniques by which musicians generally move about a fret board of a stringed instrument. In this example, the machine learning models (e.g., a neural network) may learn constraints associated with such movement (e.g., via video illustrating the movements of the fret board). For example, a machine learning model may learn that a musician may have to adjust a fingering position of a stringed instrument to play a series of musical notes which are followed up by another series of musical notes. A neural network may optionally be utilized to learn such movements and associated constraints.

While utilizing movement of hands may be utilized to learn actions for certain instruments (e.g., a violin, drums), it may not be fully suitable for other instruments. For example, the mouth movements while playing a saxophone may not be learned. As another example, the foot pedal movements of a piano may not be learned. To supplement the extracted hand movements, audio information may be analyzed. For example, mouth movements of musicians playing a saxophone may be inferred via analyses of the sound produced by the saxophone. In this example, a machine learning model may be trained to recognize indicia of such mouth movements via labeled audio corresponding to different produced sounds. Similarly, foot pedal movements may be learned based on analyses of piano audio (e.g., labeled piano audio, such as labels indicating when pedals are utilized).

In addition, the musician simulation engine 110 may be trained with respect to conductor cues. As described above, a conductor cue may cause an adjustment to different aspects of a musician playing an instrument. For example, a conductor cue may cause the musician to increase a tempo, to adjust articulation, and so on. The musician simulation engine 110 may thus learn to simulate actions of musicians based on the occurrence of different conductor cues. As an example of such learning, the engine 110 may be trained utilizing video or audio of musicians. The video or audio may include a first portion, prior to occurrence of a conductor cue, and a second portion subsequent to the occurrence of the conductor cue. Thus, the engine 110 can learn the impact, or change, in the playing style of the musician based on a conductor cue.

Additionally, the musician simulation engine 110 may utilize one or more rules regarding an adjustment caused by occurrence of a conductor cue. For example, a first rule may be associated with changes in tempo. The first rule may therefore indicate that the engine 110 is to simulate a musician playing faster or slower in accordance with the tempo. As another example, a second rule may be associated with adjustments in dynamics. The second rule may therefore indicate that the engine 110 is to simulate a musician playing louder or quieter.

As described above, the score 154 may include annotations or notes specified by a user of the user device 150. For example, the user may indicate that a portion of the score 154 is to be played with a certain emotion (e.g., sadness). The musician simulation engine 110 may learn a playing style associated with these emotions. For example, audio or video of musicians may be utilized along with labels indicating emotions being expressed via the musicians' playing to train the engine 110. Thus, the engine 110 may learn that a 'sad' emotion generally causes musicians to adjust an articulation associated with their playing.

In this way, the musician simulation engine 110 may thus simulate actions for virtual musicians. These simulated actions may be utilized by the instrument simulation engine 120 to generate audio. For example, the generated audio may comprise waveforms to be aggregated by the system 100 and provided to the user device 150 as output audio 102. The instrument simulation engine 120 may optionally generate waveforms utilizing modeled versions of instruments. For example, the engine 120 may access physical models of instruments. These physical models may be associated with information (e.g., metadata) indicting properties of features of the instruments. Example properties may include a type of material which is utilized to construct the instrument. The type of material may be utilized to inform generation of the waveforms. For example, the engine 120 may model the effect which different materials have on sound. The instrument simulation engine 120 may also utilize MIDI samples or synthesizers to generate waveforms. For example, the engine 120 may utilize violin MIDI samples or synthesizers to generate waveforms while simulating a virtual musician playing a violin.

The instrument simulation engine 120 may thus use the simulated actions as controls to the instruments. With respect to using physical models of instruments, the simulated actions may be recreated on the physical models. For example, simulated actions for a violin may include pressing downward on different frets while a bow is run across the violin according to a particular style. With respect to using MIDI samples or synthesizers, the engine 120 may select particular samples based on the actions. As an example, a simulated action may include an overblow playing style technique applied to a woodwind. In this example, the engine 120 may select MIDI samples of a woodwind with such a technique applied. Additionally, the engine 120 may adjust particular samples based on the actions. For example, a simulated action may include a bending of a string of a guitar. In this example, the engine 120 may thus adjust a MIDI sample to mimic the bending. For example, the engine 120 may adjust the MIDI sample in a frequency domain (e.g., the sample may be shifted upwards, in accordance with known frequency adjustments caused by bending). As another example, the engine 120 may utilize machine learning techniques to adjust the MIDI sample.

The instrument simulation engine 120 may therefore generate audio corresponding to each of the simulated instruments performing the score 154. The generated audio may then be combined by the virtual orchestra system 100 to create output audio 102 for auditory presentation via the user device 150. As described above, the generated audio corresponding to the simulated instruments may be simulated as occurring within a same music hall. Thus, the combined audio may have added realism and more closely adhere to a sound achievable by real-world instruments.

The output audio 102 associated with the score 154 may be stored (e.g., via virtual orchestra system 100). As described above the stored output audio may represent an audio recording. The stored audio may then be accessed by the user device 150. For example, the system 100 may store generated output audio associated with multitudes of scores. A user of the user device 150 may request the stored output audio, for example subsequent to completion of the score 154. Optionally, upon completion of performance of the score 154, the system 100 may push a stored version of the output audio 102 to the user device 150. The stored output audio may be stored according to different formats (e.g., compressed or uncompressed formats) and optionally stored as stereo, surround sound, and so on.

Figure 2B:
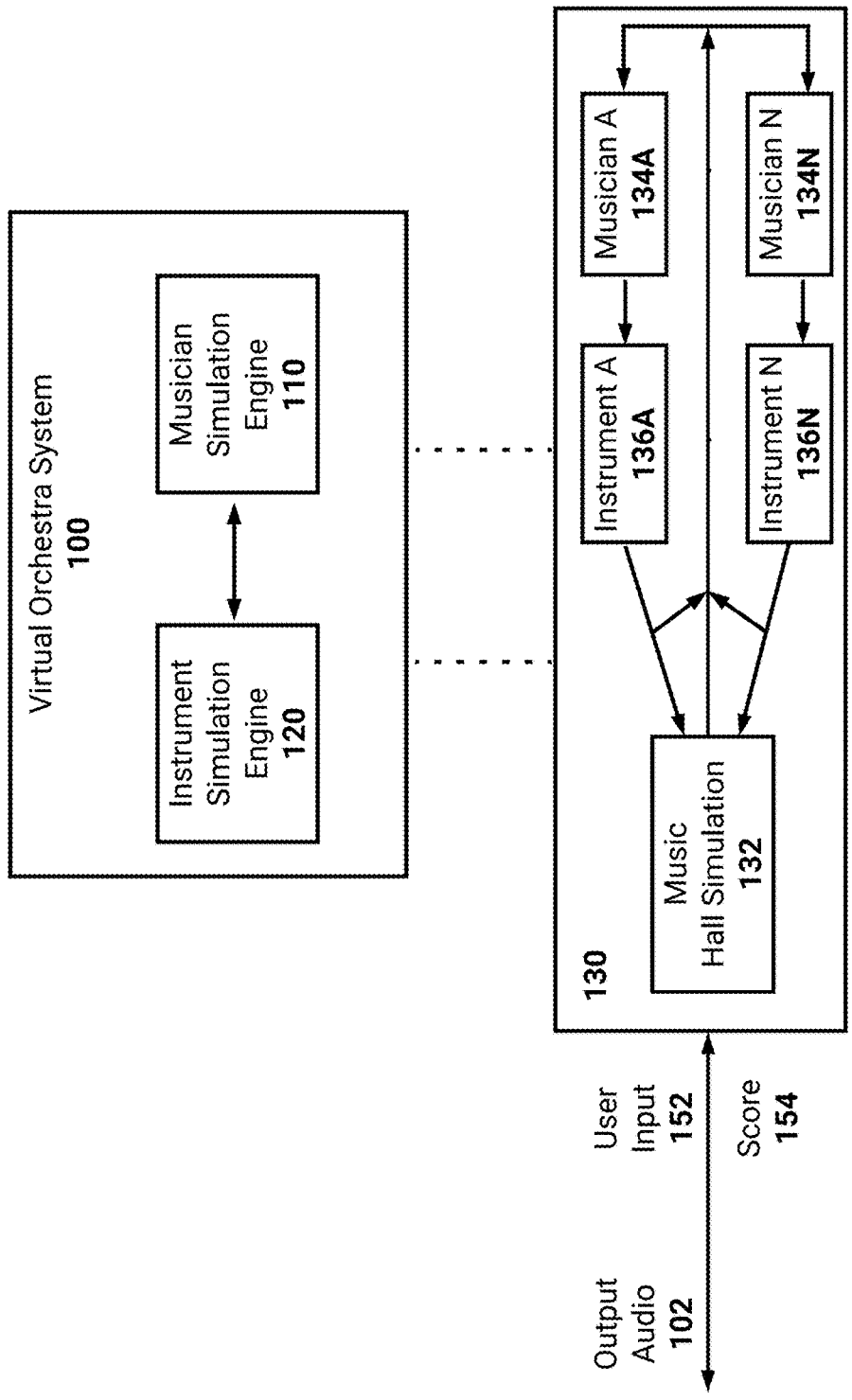
FIG. 2B is another example block diagram of the virtual orchestra system.

FIG. 2B is another example block diagram of the virtual orchestra system 100. FIG. 2B incldues a block diagram 130 representing the different simulations being generated by the virtual orchestra system 100. As illustrated in block diagram 130, the virtual orchestra system 100 may receive user input 152 (e.g., conductor cues) and a score 154 to be performed. This received information may be provided to the virtual musicians A-N 134A-N. As described in FIG. 2A, the musician simulation engine 110 may simulate actions associated with these virtual musicians 134A-N. The simulated actions may then be provided to respective instruments A-N 136A-N, for example as control information to cause the system 100 to generate waveforms associated with the instruments 136A-N.

As further illustrated, a music hall simulation 132 block is included in block diagram 130. The music hall simulation 132 may receive the waveforms associated with the instruments 136A-N, and then aggregate them to be provided as output audio 102. As described in FIG. 1, the virtual orchestra system 100 may simulate specific music halls. Additionally, the virtual orchestra system 100 may utilize a template of music hall. For example, the template may correspond to an average, or typical, music hall. Optionally, a user may provide a physical model of a music hall (e.g., a three-dimensional model). The user may also specify locations at which the instruments are to be included within the model. Thus, the music hall simulation block 132 may aggregate the waveforms based on the provided music hall.

Furthermore, the music hall simulation block 132 may provide the aggregated audio to each of the virtual musicians 134A-N. For example, the virtual musicians 134A-N may receive a lower fidelity representation of the entire performance. Optionally, the musician simulation engine 110 may utilize the lower fidelity representation as an input when simulating actions of the virtual musicians 134A-N. It should be appreciated that during a real-world symphonic performance, the musicians may feed, or otherwise play, off of each other. While a conductor may provide conductor cues for interpretation by the musicians, the musicians may also utilize the overall sound being produced by remaining musicians. Similarly, the musician simulation engine 110 can utilize the aggregated audio from the music hall simulation 132 to adjust simulated actions. For example, the engine 110 may adjust an articulation being played by a virtual musician based on the aggregated audio. As another example, the engine 110 may ensure that a same tempo, beat emphasis, and so on, is being maintained by the virtual musicians. To adjust the simulated actions, the system 100 may utilize machine learning techniques trained on large-scale orchestra musician interactions.

Example User Interfaces/User Input

FIG. 3A illustrates a representation of a user providing conductor cues via different user input schemes. In portion 310, a user 302 is illustrated as holding an input device 304. In this example portion 310, a video input device (e.g., a camera) of a user device 150 is capturing images or video of the user 302. As described in FIGS. 1-2B, the user device may analyze the captured images or video and extract conductor cues. Optionally, the user device may learn a shape and/or visual look associated with the input device 304. For example, an initial training period may be performed during which the user 302 may hold out the input device 304. Optionally, the input device 304 may have one or more lights (e.g., at a tip) such that it may be rapidly recognized.

In portion 320, the input device 304 is illustrated as providing movement information to the user device 150 via a wireless connection (e.g., Bluetooth, WiFi, infrared, and so on). For example, the input device 304 may include one or more sensors comprising accelerometers, gyroscopes, compasses, and so on. In this example, the input device may thus provide information measured via these sensors to the user device 150. This information may be utilized to inform movement of the input device 304. Optionally, the input device 304 may analyze the sensor information to determine key-features associated with the movement. For example, the input device 304 may provide successive indications of adjustments in three-dimensional space.

Figure 3B:
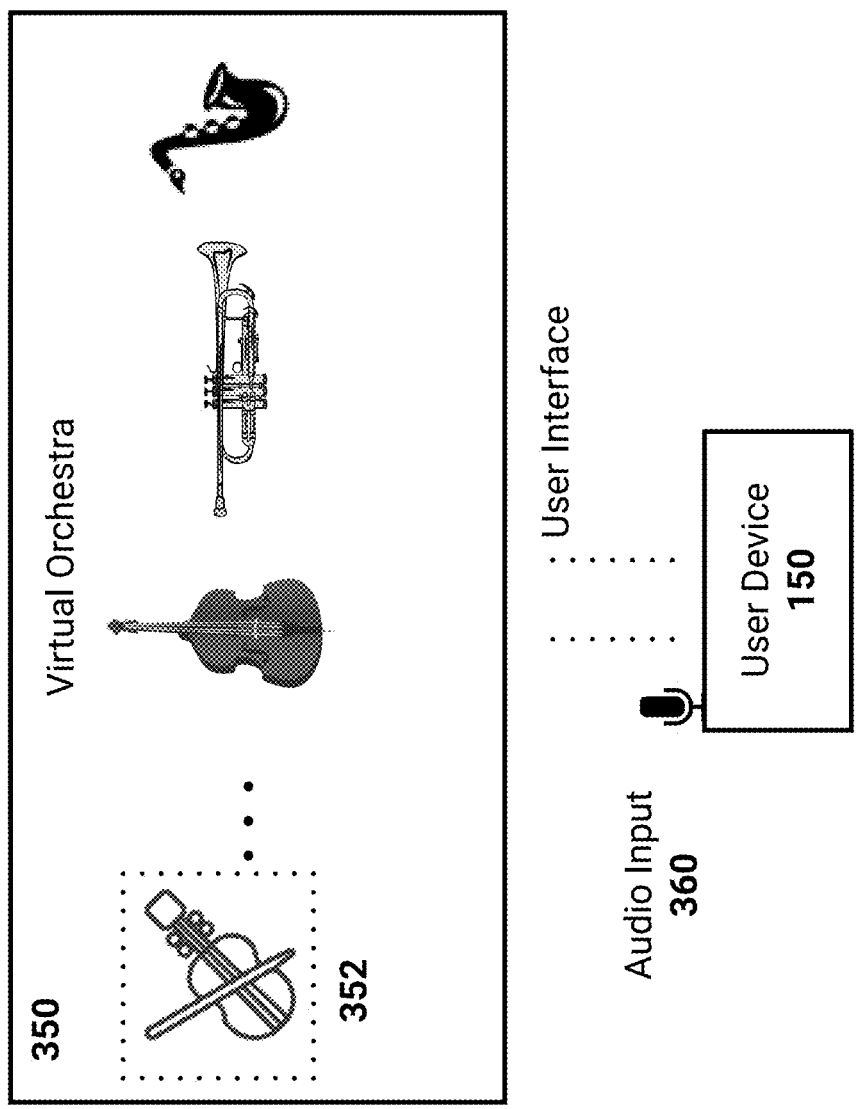
FIG. 3B illustrates a representation of a user providing input to an example user interface.
Figure 3B:
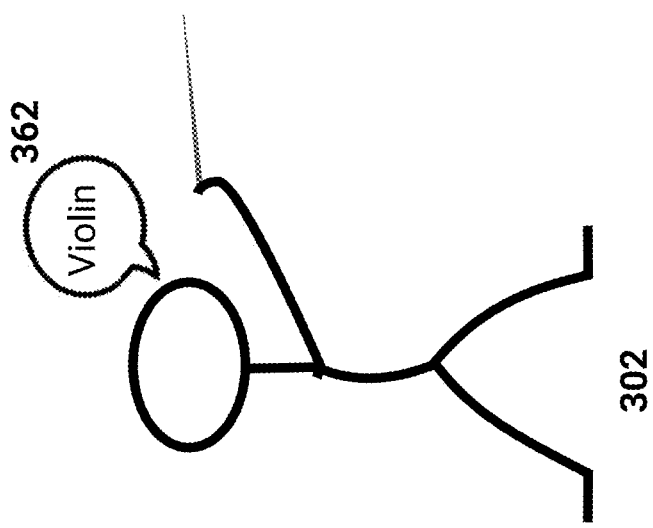

FIG. 3B illustrates a representation of the user 302 providing input to an example user interface 350. As described above, the user device 150 may present a user interface associated with conducting virtual musicians. In some embodiments, the user interface may present a graphical representation of the virtual musicians. For example, the virtual musicians may be presented as playing respective instruments. In the example of FIG. 3B, user interface 350 presents representations of instruments being utilized to perform a score.

While the virtual orchestra system 100 generates audio for the score based on simulations of virtual musicians and/or instruments, the user 302 may provide conductor cues. As described above, the conductor cues may be utilized by the system 100 during simulation of the virtual musicians. While the conductor cues may be generally utilized by all virtual musicians, the user 302 may optionally direct conductor cues to certain virtual musicians.

As illustrated, the user 302 has provided a verbal command 362 to indicate that one or more conductor cues are to be directed to the violins. The user device 150 may include, or receive information from, an audio input device 360 (e.g., a microphone). Thus, the user device 150 may analyze the verbal command 362 and identify the verbal command 362 as specifying violins. The user device 150 may then provide this identification to the system 100, or alternatively the system 100 may receive the verbal command 362 for analysis.

Additionally, the user interface 350 may be updated to reflect selection of the violins. For example, the violin included in the user interface 350 has been called out (e.g., highlighted, shaded, a box included around the violin, and so on). Thus, the user 302 may rapidly ascertain which instrument is currently responding to conductor cues. Optionally, the conductor cues may be directed to the violin until the user 302 provided a verbal command indicating a different instrument or all of the instruments.

In some embodiments, the user 302 may generate groupings of instruments. For example, the user 302 may provide a command such as, 'group violin and saxophone'. Additionally, groupings may be based on features associated with instruments. For example, a grouping may comprise all brass instruments. Another example grouping may comprise all stringed instruments. The groupings may further be based on purpose, such as groupings of instruments which provide a beat or lower end of the frequency spectrum. Thus, the user 302 may specify a grouping according features, and the user device 150 or system 100 may automatically identify the referenced instruments. In this way, the user 302 may provide conductor cues to groups of instruments.

Figure 3C:
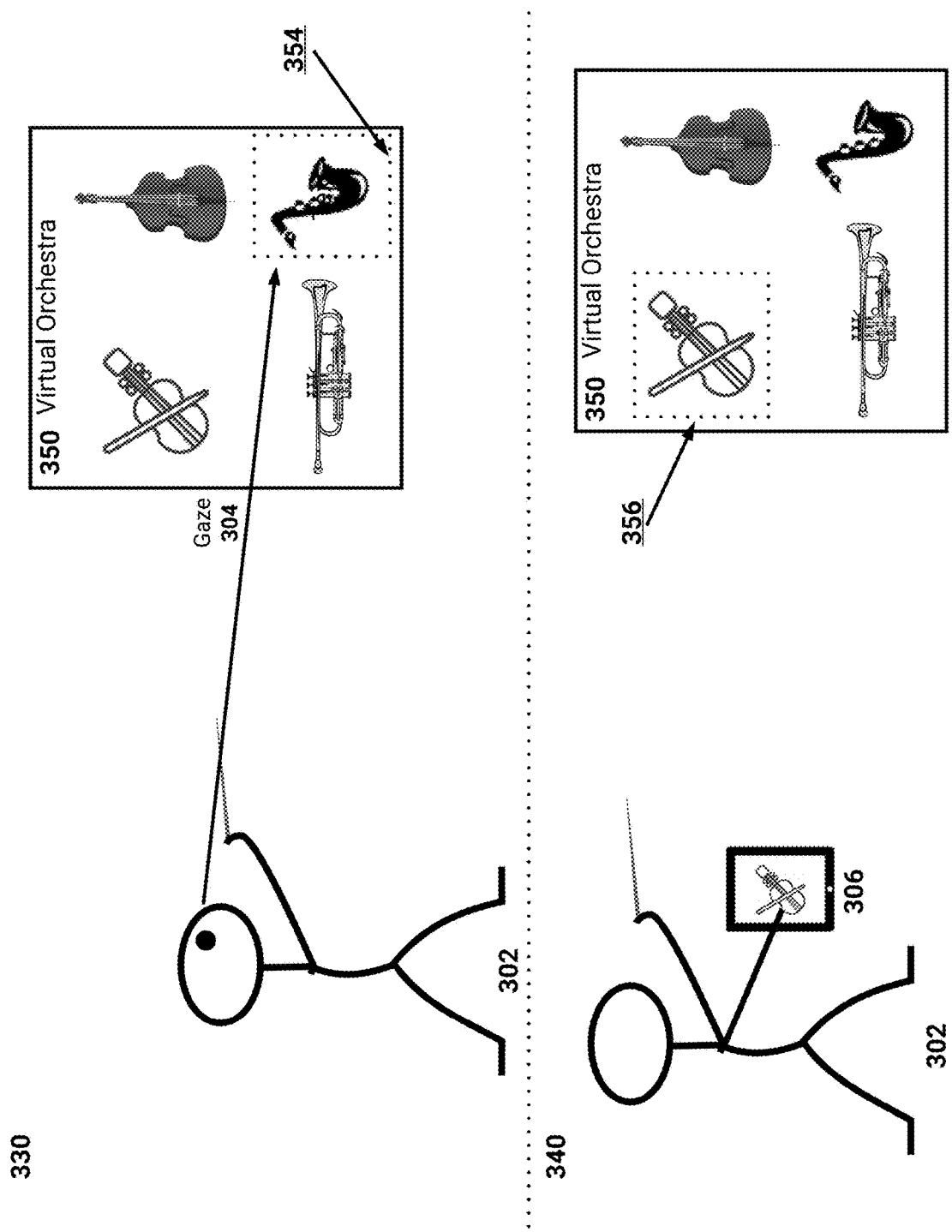
FIG. 3C illustrates another representation of the user providing input to an example user interface.

FIG. 3C illustrates additional representations of the user 302 providing input to an example user interface 350. In portion 330, the user 302 is illustrated as selecting an instrument 354 based on his/her gaze 304. In this example, the user 302 may direct his/her attention (e.g., eyesight) to a particular instrument presented in the user interface 350. The user 302 may then provide one or more conductor cues which will be utilized by the system 100 during simulations associated with the particular instrument. Optionally, the user 302 may be required to focus his/her gaze on the instrument 354 for greater than a threshold time. To determine the gaze 304 of the user, a camera may be utilized to monitor the user's 302 eyes. For example, a pupil of the eyes may be extracted. A vector may then be extended from each eye, and an intersection associated with the vectors may be determined.

In portion 340, the user 302 is illustrated as selecting an instrument 356 based on interactions with a device 306. For example, the device 306 may be a mobile device (e.g., a tablet or mobile phone). The device 306 may present an indication of one or more instruments, and the user 302 may select from among the indications. Optionally, the device 306 may be a wearable device (e.g., a smart watch). The user 302 may utilize a touch-screen display, or particular input element (e.g., a digital crown), to select from among instruments presented via the wearable device. The selection may then be provided to the user device 150, and the user interface 350 updated to reflect the selection.

Processes for Generating Audio Using a Virtual Orchestra

Figure 4:
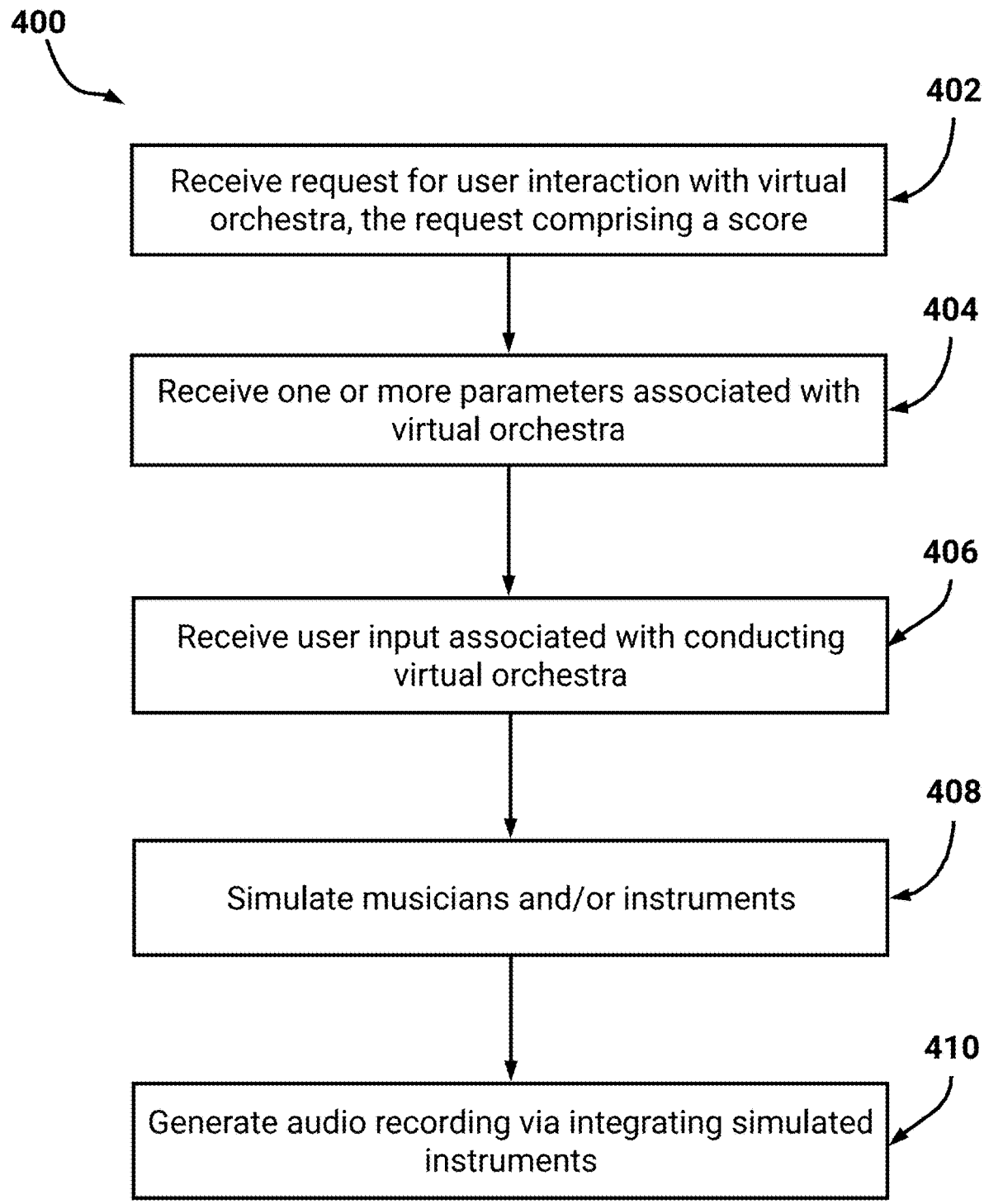
FIG. 4 is a flowchart of an example process for generating an audio recording using a simulated orchestra.

FIG. 4 is a flowchart of an example process 400 for generating an audio recording using a simulated virtual orchestra. For convenience, the process 400 will be described as being performed by a system of one or more computers (e.g., the virtual orchestra system 100).

At block 402, the system receives a request for user interaction with a virtual orchestra. As described in FIGS. 1-2B, a user may utilize a user device to access a user interface associated with the system. For example, the user interface may be presented as a web application being generated, at least in part, by the system. Via user interactions with the user interface, the system may receive a request for the system to generate output audio associated with a score. The system may thus receive the score from the user, for example in the request. Additionally, the system may store, or have access to, multitudes of scores to be performed. In this example, the system may receive information indicating user selection of a particular score.

Optionally, the score may be provided with annotations or notes. As an example of an annotation, the user may mark (e.g., via hand written notes, via text on the score, or via metadata provided with the score) that a portion of the score is to be played with a particular emotion (e.g., sadness, happiness, aggressive). As another example of an annotation the user may indicate that a portion of the score is to be played with a particular articulation. The system may analyze these annotations or notes, and as the system simulates virtual musicians (e.g., as described above) the simulations may be based on these annotations or notes.

At block 404, the system receives one or more parameters associated with the virtual orchestra. An example parameter, which may be specified by the user, may include an indication of the types of instruments to perform the score and optionally a number of each type. Another example parameter may include a specification of a music hall which is to be simulated. As described above, the system may simulate the audio associated with the simulated instruments as being included in a same music hall.

At block 406, the system receives user input associated with conducting the virtual orchestra. As illustrated in FIGS. 3A-3C, the user may provide conductor cues during performance of the score. As an example, the user may indicate that a particular instrument, or group of instruments, is to play louder. In this example, the user may utilize his hands or an input device to point at a representation of the instruments (e.g., as presented via a user interface). As another example, a particular instrument may be absent from performance of the score for a period of time. As the system simulates performance of the score, the time at which the particular instrument is to start playing may approach. The user may specify a specific time at which the particular instrument is to begin. For example, the user may point at the particular instrument to indicate the virtual musicians paying the particular instrument are to begin. The user may also provide other user input, such as described in FIGS. 3A-3C (e.g., a verbal command, via interaction with a tablet, and so on). Optionally, the system may automatically cause the virtual musicians to begin playing absent specific instructions from the user.

At block 406, the system simulates virtual musicians and/or instruments. The system may simulate actions which virtual musicians may perform while performing the score. As described above, the actions may indicate key features of performing an instrument. For example, a key feature may include a speed at which musical notes are transitioned to. As another example, a key feature may include an articulation associated with playing musical notes. As another example, a key feature may include an indication of tempo, emphasis on beat, and so on. Additionally, the actions may indicate more complex information. For example, machine learning techniques may be utilized to inform the techniques by which a virtual musician may play an instrument. In this example, the techniques may indicate a particular style of playing, the actual fingering utilized to play, bowing techniques (e.g., bowing speed, style, length of bowing, and so on). The system may then utilize these simulated actions to generate audio (e.g., waveforms) for the instruments. As described above, the system may utilize physical models of instruments and thus generate audio based on applying the actions to the physical models (e.g., from first principles). Additionally, the system may select, and/or adjust, MIDI samples of instruments.

Furthermore, the system may utilize any received user input from the user. For example, the system may utilize the conductor cues described above. As an example, the system may increase a tempo associated with a virtual musician playing an instrument. As another example, the system may increase a loudness associated with the virtual musician playing the instrument.

At block 410, the system generates output audio via integrating the simulated instruments. The system may aggregate the generate audio associated with the instruments. Optionally, the system may simulate the instruments as being included in a same music hall. The generated output audio may thus be provided to the user device. For example, the output audio may be provided in real-time. In this way, the user may, in real-time, listen to performance of the selected score. The user may also provide conductor cues to adjust aspects of the performance.

Figure 5:
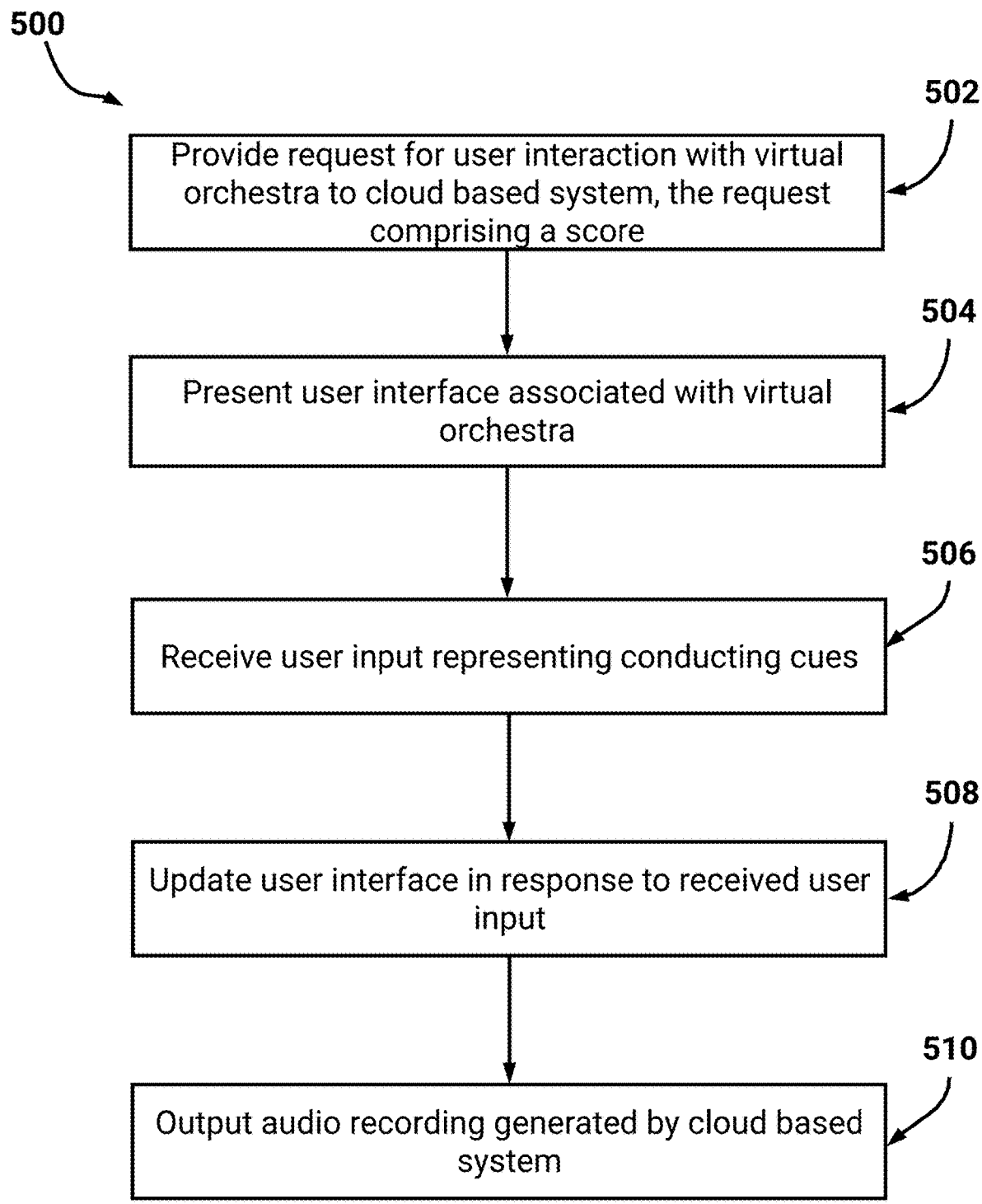
FIG. 5 is a flowchart of an example process for outputting an audio recording based on provided conductor cues.

FIG. 5 is a flowchart of an example process 500 for outputting an audio recording based on provided conductor cues. For convenience, the process 500 will be described as being performed by a user device of one or more processors (e.g., the user device 150).

At block 502, the user device provides a request for user interaction with a virtual orchestra. The request, as described above, may indicate selection of a score to be performed by a system (e.g., the virtual orchestra system 100). At block 504, the user device presents a user interface associated with the virtual orchestra. Example user interfaces are described above and illustrated in FIGS. 3A-3C.

At block 506, the user device receives user input representing conductor cues. The system may thus simulate performance of the score, and the user device may present real-time output audio from the simulation. During the simulation, the user may provide user input to cause adjustment of the simulation via conductor cues. At block 508, the user device updates the user interface in response to received user input. As described in FIGS. 3A-3C, the user may indicate that a conductor cue is to be provided to a specific type of instrument. The user interface may thus update to call out, or otherwise highlight, the specific type of instrument. Optionally, the user interface may be updated to reflect graphical depictions of virtual musicians playing instruments (e.g. a real-time animation may be rendered).

At block 5010, the user device outputs audio from the simulation. Additionally, the user device may receive, or generate via the received output audio, an audio recording corresponding to performance of the score.

Overview of Computing Device

Figure 6:
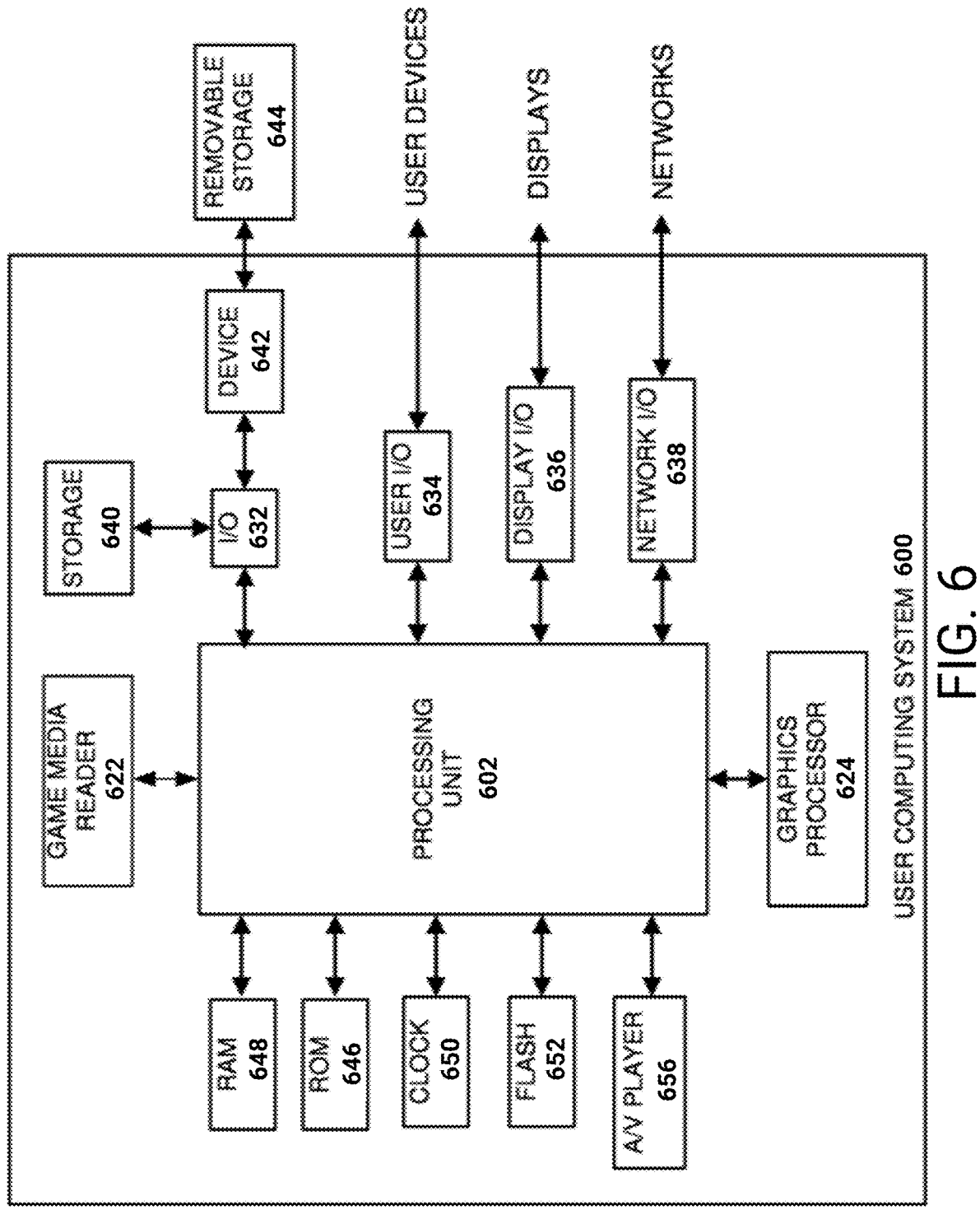
FIG. 6 illustrates an embodiment of computing device according to the present disclosure.

FIG. 6 illustrates an embodiment of computing device 610 according to the present disclosure. Other variations of the computing device 610 may be substituted for the examples explicitly presented herein, such as removing or adding components to the computing device 610. The computing device 610 may include a game device, a smart phone, a tablet, a personal computer, a laptop, a smart television, a car console display, a server, and the like. The computing device 610 may also be distributed across multiple geographical locations. For example, the computing device 610 may be a cluster of cloud-based servers.

As shown, the computing device 610 includes a processing unit 620 that interacts with other components of the computing device 610 and also external components to computing device 610. A game media reader 622 is included that communicates with game media 612. The game media reader 622 may be an optical disc reader capable of reading optical discs, such as CD-ROMs or DVDs, or any other type of reader that can receive and read data from game media 612. One or more of the computing devices may be used to implement one or more of the systems disclosed herein.

Computing device 610 may include a separate graphics processor 624. In some cases, the graphics processor 624 may be built into the processing unit 620. In some such cases, the graphics processor 624 may share Random Access Memory (RAM) with the processing unit 620. Alternatively or additionally, the computing device 610 may include a discrete graphics processor 624 that is separate from the processing unit 620. In some such cases, the graphics processor 624 may have separate RAM from the processing unit 620. Computing device 610 might be a handheld game application device, a dedicated game console computing system, a general-purpose laptop or desktop computer, a smart phone, a tablet, a car console, or other suitable system.

Computing device 610 also includes various components for enabling input/output, such as an I/O 632, a user I/O 634, a display I/O 636, and a network I/O 638. I/O 632 interacts with storage element 640 and, through a device 642, removable storage media 644 in order to provide storage for computing device 610. Processing unit 620 can communicate through I/O 632 to store data, such as game state data and any shared data files. In addition to storage 640 and removable storage media 644, computing device 610 is also shown including ROM (Read-Only Memory) 646 and RAM 648. RAM 648 may be used for data that is accessed frequently, such as when a video game is being played.

User I/O 634 is used to send and receive commands between processing unit 620 and user devices, such as game controllers. In some embodiments, the user I/O 634 can include a touchscreen input. The touchscreen can be capacitive touchscreen, a resistive touchscreen, or other type of touchscreen technology that is configured to receive user input through tactile inputs from the player. Display I/O 636 provides input/output functions that are used to display images from the game being played. Network I/O 638 is used for input/output functions for a network. Network I/O 638 may be used during execution of a game, such as when a game is being played online or being accessed online, application of fraud detection, and/or generation of a fraud detection model.

Display output signals produced by display I/O 636 comprise signals for displaying visual content produced by computing device 610 on a display device, such as graphics, user interfaces, video, and/or other visual content. Computing device 610 may comprise one or more integrated displays configured to receive display output signals produced by display I/O 636. According to some embodiments, display output signals produced by display I/O 636 may also be output to one or more display devices external to computing device 610.

The computing device 610 can also include other features that may be used with a video game, such as a clock 650, flash memory 652, and other components. An audio/video player 656 might also be used to play a video sequence, such as a movie. It should be understood that other components may be provided in computing device 610 and that a person skilled in the art will appreciate other variations of computing device 610.

Program code can be stored in ROM 646, RAM 648 or storage 640 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 640, and/or on removable media such as game media 612 (which can be a CD-ROM, cartridge, memory chip or the like, or obtained over a network or other electronic channel as needed). In general, program code can be found embodied in a tangible non-transitory signal-bearing medium.

Random access memory (RAM) 648 (and possibly other storage) is usable to store variables and other game and processor data as needed. RAM 648 is used and holds data that is generated during the execution of an application and portions thereof might also be reserved for frame buffers, application state information, and/or other data needed or usable for interpreting user input and generating display outputs. Generally, RAM 648 is volatile storage and data stored within RAM 648 may be lost when the computing device 610 is turned off or loses power.

As computing device 610 reads game media 612 and provides an application, information may be read from game media 612 and stored in a memory device, such as RAM 648. Additionally, data from storage 640, ROM 646, servers accessed via a network (not shown), or removable storage media 644 may be read and loaded into RAM 648. Although data is described as being found in RAM 648, it will be understood that data does not have to be stored in RAM 648 and may be stored in other memory accessible to processing unit 620 or distributed among several media, such as game media 612 and storage 640.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
by a system of one or more computers,
receiving, from a user device, a request to generate output audio associated with a musical score;
simulating, based on one or more machine learning models, actions associated with virtual musicians with respect to respective instruments during performance of the musical score;
receiving user input comprising conductor cues during the performance of the musical score, the user input being received from an interactive user interface presented via the user device and the interactive user interface presenting a graphical representation of the virtual musicians or the instruments, wherein a particular conductor cue of the conductor cues is directed to a subset of the virtual musicians or to a particular instrument of the subset of the virtual musicians, and wherein the simulated actions associated with the subset of the virtual musicians are generated based, at least in part, on the particular conductor cue, the simulated actions being indicative of the subset of the virtual musicians performing the musical score based, at least in part, on the particular conductor cue; and
generating output audio to be provided to the user device, the output audio being generated based on the simulated actions by the virtual musicians.

2. The computer-implemented method of claim 1, wherein the generated output audio is provided to the user device in substantially real-time, such that the user may provide the user input to adjust the simulated actions during performance of the musical score.

3. The computer-implemented method of claim 2, wherein the conductor cues are based on movement of a user's hands or an input device during performance of the musical score.

4. The computer-implemented method of claim 3, wherein a conductor cue indicates a particular tempo, a particular beat, an adjustment of articulation, or an adjustment of dynamics.

5. The computer-implemented method of claim 1, wherein the simulated actions indicate key-features associated with a playing style.

6. The computer-implemented method of claim 1, wherein the simulated actions represent continual actions generated via the one or more machine learning models, the continual actions representing expected actions a real-world musician would perform on an instrument.

7. The computer-implemented method of claim 1, wherein generating output comprises generating audio associated with each of the instruments and aggregating the generated audio.

8. The computer-implemented method of claim 7, wherein generating audio associated with a particular instrument comprises:

accessing information describing a physical model of the particular instrument, the physical model representing geometric and/or structural characteristics of the particular instrument;
applying the simulated actions associated with the particular instrument; and
generating audio based on the application.

9. The computer-implemented method of claim 7, wherein generating audio associated with a particular instrument comprises:
accessing a plurality of musical instrument digital interface (MIDI) samples associated with the particular instrument, the MIDI samples being associated with labels representing aspects of a playing style;
selecting, based on the simulated actions associated with the particular instrument, MIDI samples; and
generating audio based on the selected MIDI samples.

10. A system comprising one or more computers and non-transitory computer storage media storing instructions that when executed by the one or more computers, cause the one or more computers to perform operations comprising:
receiving, from a user device, a request to generate output audio associated with a musical score;
simulating, based on one or more machine learning models, actions associated with virtual musicians with respect to respective instruments during performance of the musical score;
receiving user input comprising conductor cues during the performance of the musical score, the user input being received from an interactive user interface presented via the user device and the interactive user interface presenting a graphical representation of the virtual musicians or the instruments, wherein a particular conductor cue of the conductor cues is directed to a subset of the virtual musicians or to a particular instrument of the subset of the virtual musicians, and wherein the simulated actions associated with the subset of the virtual musicians are generated based, at least in part, on the particular conductor cue, the simulated actions being indicative of the subset of the virtual musicians performing the musical score based, at least in part, on the particular conductor cue; and
generating output audio to be provided to the user device, the output audio being generated based on the simulated actions by the virtual musicians.

11. The system of claim 10, wherein the conductor cues are based on movement of a user's hands or an input device.

12. The system of claim 11, wherein a conductor cue indicates a particular tempo, a particular beat, an adjustment of articulation, or an adjustment of dynamics.

13. The system of claim 10, wherein the simulated actions indicate key-features associated with a playing style.

14. The system of claim 10, wherein the simulated actions represent continual actions generated via the one or more machine learning models, the continual actions representing expected actions a real-world musician would perform on an instrument.

15. The system of claim 10, wherein generating output comprises generating audio associated with each of the instruments and aggregating the generated audio.

16. The system of claim 15, wherein generating audio associated with a particular instrument comprises:
accessing a plurality of musical instrument digital interface (MIDI) samples associated with the particular instrument, the MIDI samples being associated with labels representing aspects of a playing style;

selecting, based on the simulated actions associated with the particular instrument, MIDI samples; and generating audio based on the selected MIDI samples.

17. Non-transitory computer storage media storing instructions that when executed by a system of one or more computers, cause the computers to perform operations comprising:

receiving, from a user device, a request to generate output audio associated with a musical score;

simulating, based on one or more machine learning models, actions associated with virtual musicians with respect to respective instruments during performance of the musical score;

receiving user input comprising conductor cues during the performance of the musical score, the user input being received from an interactive user interface presented via the user device and the interactive user interface presenting a graphical representation of the virtual musicians or the instruments, wherein a particular conductor cue of the conductor cues is directed to a subset of the virtual musicians or to a particular instrument of the subset of the virtual musicians, and wherein the simulated actions associated with the subset of the virtual musicians are generated based, at least in part, on the particular conductor cue, the simulated actions being indicative of the subset of the virtual musicians performing the musical score based, at least in part, on the particular conductor cue; and generating output audio to be provided to the user device, the output audio being generated based on the simulated actions by the virtual musicians.

18. The computer storage media of claim 17, wherein the conductor cues are based on movement of a user's hands or an input device.

19. The computer storage media of claim 17, wherein generating output comprises generating audio associated with each of the instruments and aggregating the generated audio.

20. The computer storage media of claim 19, wherein generating audio associated with a particular instrument comprises:

accessing a plurality of musical instrument digital interface (MIDI) samples associated with the particular instrument, the MIDI samples being associated with labels representing aspects of a playing style;

selecting, based on the simulated actions associated with the particular instrument, MIDI samples; and generating audio based on the selected MIDI samples.

* * * * *